United States Patent [19]
Ishida

[11] Patent Number: 5,721,734
[45] Date of Patent: Feb. 24, 1998

[54] CODE DIVISION MULTIPLE ACCESS UNIT AND CODE DIVISION MULTIPLE ACCESS METHOD

[75] Inventor: Kenji Ishida, Tokyo, Japan

[73] Assignee: NEC Corporation, Japan

[21] Appl. No.: 639,379

[22] Filed: Apr. 26, 1996

[30] Foreign Application Priority Data

Apr. 28, 1995 [JP] Japan .................. 7-128890

[51] Int. Cl.6 .................................. H04B 7/216
[52] U.S. Cl. ............... 370/335; 370/441; 375/206
[58] Field of Search .................. 370/18, 19, 320, 370/335, 342, 441; 375/205, 206

[56] References Cited

U.S. PATENT DOCUMENTS

| | | | |
|---|---|---|---|
| 4,425,562 | 1/1984 | Pe Niet | 340/347 |
| 4,494,228 | 1/1985 | Gutleber | 370/18 |
| 4,561,089 | 12/1985 | Rouse et al. | 370/18 |
| 4,979,183 | 12/1990 | Cowart | 375/1 |

FOREIGN PATENT DOCUMENTS

| | | | |
|---|---|---|---|
| 62-176232 | 8/1987 | Japan | H04J 13/00 |
| 2-11071 | 3/1990 | Japan | H04N 7/00 |
| 3-230637 | 10/1991 | Japan | H04L 9/06 |
| 5-316072 | 11/1993 | Japan | H04J 13/00 |
| 5-347599 | 12/1993 | Japan | H04J 13/00 |

*Primary Examiner*—Douglas W. Olms
*Assistant Examiner*—A. Bnimoussa
*Attorney, Agent, or Firm*—Ostrolenk, Faber, Gerb & Soffen, LLP

[57] ABSTRACT

The present invention comprises addition/subtraction means 101 to 107 and exclusive OR circuits 111 to 125. The addition/subtraction means performs addition (A+B: sub/add=0) or subtraction (A−B: sub/add=1) according to a logic value of the control terminal sub/add. The transmission amplitude signals amp0 to amp7 with a plural bits width are input to the addition/subtraction means 101 to 104 at each two channels. The exclusive OR 10 circuits 111 to 118 calculates an exclusive OR of the transmission data d0 to d7 and the spread code sequence signals c0 to c7. The resultant code sequence signals s0 to s7 are input to the control terminals sub/add's of the addition/subtraction means. The addition/subtraction means 108 at the last step inverts the code and outputs the spread synthesis signal sum spread with spread code sequence signal c0 to c7.

12 Claims, 3 Drawing Sheets

5,721,734

CODE DIVISION MULTIPLE ACCESS UNIT AND CODE DIVISION MULTIPLE ACCESS METHOD

BACKGROUND OF THE INVENTION

The present invention relates to a code division multiple access (CDMA) unit used in a base station for mobile communication through a spread spectrum system. More particularly, this invention relates to the code division multiple access art requiring no polarity inverter for spreading and synthesizing transmission signals of a plurality of communication channels.

FIG. 3 is a block diagram showing a construction of a conventional code division multiple access (CDMA) unit. This CDMA unit as the prior art is assumed to spread and synthesize transmission signals of 8 channels. One channel is equivalent to one telephone line.

The CDMA unit is provided with polarity inverters 301 to 308 and adders 311 to 317 for processing transmission signals of 8 channels and exclusive OR circuits (EX-OR gate) 321 to 328.

SEL Control terminals of the polarity inverters 301 to 308 are connected to the exclusive OR circuits 321 to 328, respectively. Each of the polarity inverters 301 to 308 controls non-inversion/inversion of the code of the input data in the way expressed by the following equation (1):

$$SE1 = \begin{pmatrix} 0 & \text{(non-inversion)} \\ 1 & \text{(inversion)} \end{pmatrix} \quad (1)$$

Referring to FIG. 3, each transmission amplification signals corresponding to 8 channels(0 to 7) amp0, amp1, amp2, amp3, amp4, amp5, amp6 and amp7 has a plural bits width (for example, 16 bit width). Transmission data d0, d1, d2, d3, d4, d5, d6 and d7 represent the transmission data logic. Spread code sequence signals c0, c1, c2, c3, c4, c5, c6 and c7 represent the spread code sequence for distinguishing one channel from another.

Each of the transmission amplification signal amp0 to amp7 is normally updated at every block of plural transmission data d0 to d7. When spreading 1 symbol of the transmission data with M chip (M is an integer), the spread code sequence signals c0 to c7 are varied with a clock signal equivalent to the transmission data d0 to d7 multiplied by M.

The operation of the prior art is described.

Each code sequence of s0, s1, s2, s3, s4, s5, s6 and s7 is produced through exclusive OR circuits 321 to 328 by obtaining exclusive OR of the transmission data d0 to d7 and the spread code sequence signals c0 to c7 at each channel, respectively. The resultant code sequence s0 to s7 are input to each SEL control terminal of the polarity inverters 301 to 308, respectively for non-inversion/inversion of the transmission amplification signals amp0 to amp7.

The transmission amplification signals amp0 to amp7 are input to input terminals A and B of the first stage adders 311 to 314 at every 2 channel, respectively. Synthesized outputs of the first stage adders 311 and 312 are input to input terminals A and B of the second stage adder 315. Synthesized outputs of the first stage adders 313 and 314 are input to input terminals A and B of the second stage adder 316. The synthesized output of the second adder 315 is input to an input terminal A of the third stage adder 317. The synthesized output of the second adder 316 is likewise input to an input terminal B of the third stage adder 317. The adder 317 transmits the synthesized 8-channel signal spread/synthesis output (signal) sum.

The conventional CDMA unit requires to prepare the polarity inverter for each channel. Referring to FIG. 3, 8 channels require 8 polarity inverters 301 to 308 corresponding thereto, respectively. The CDMA unit requires the same number of polarity inverters as that of the channel, resulting in expanding the size of the circuit and signal processing section. The unit size itself, thus should be expanded in order to accommodate the enlarged circuit, leading to increased power consumption and complicated manufacturing process.

The similar prior arts have been disclosed in the following publications of Japan Patent Application Laid-Open Nos. 176232/1987, titled "Multi-transmission system"; 11071/1990 titled "Simultaneous transmission system of video and data signals"; 230637/1991, titled "Confidential communication system and transmission/reception unit"; 316072/1993, titled "Spread spectrum communication unit"; and 347599/1993, titled "High-speed data transmission unit". Those prior arts have the similar drawbacks to that of the aforementioned CDMA unit.

SUMMARY OF THE INVENTION

It is an object of the present invention to solve the aforementioned problems by providing the art for reducing the size of the circuit and signal processing section of the CDMA unit when executing spreading and synthesizing in the base station through the code division multiple access system so as to keep the unit compact, decrease power consumption and simplify the manufacturing process.

It is another object of the present invention to provide the art for spreading and synthesizing a plurality of channels by using addition/subtraction circuits and exclusive OR circuits only.

The objects of the present invention are achieved by a code division multiple access unit for spreading and synthesizing transmission signals of a plurality of channels by using a spread spectrum system comprising:

first logic processing means for producing a transmission code sequence based on a logic of a transmission signal and a spread code sequence at each channel;

addition/subtraction means for adding and/or subtracting a transmission amplification signal of the each channel; and second logic processing means for producing a control signal which controls addition and/or subtraction of the addition/subtraction means based on the transmission code sequence produced by the first logic processing means.

Furthermore, the objects of the present invention are achieved by a code division multiple access method for spreading and synthesizing transmission signals of a plurality of channels by using a spread spectrum system, the method comprising steps of:

producing a polar code sequence representing polarity of a transmission signal of the predetermined channel based on a logic of a transmission signal of a predetermined channel and spread code sequence of the predetermined channel at every channel;

producing a control signal based on a logic of a polar code sequence at each pair of two values of the polar code sequence; and synthesizing transmission amplification signal equivalent to 1 pair by adding and/or subtracting based on a control signal of each pair.

In the present invention, a transmission code sequence is produced with a logic of transmission signals of a plurality of channels and the spread code sequence. The transmission amplification signal at each channel is added or subtracted responding to the control signal based on the transmission code sequence. That is, forwarding/inversion of the code is substituted with adding/subtracting for conducting spreading and synthesizing simultaneously.

Unlike the conventional practice applied to the prior art, spreading and synthesizing are not conducted separately but conducted simultaneously, thus eliminating the polarity inverter prepared by each channel. Therefore the present invention can be constructed by using addition/subtraction circuits and exclusive OR circuits only. As a result, this construction realizes down-sizing of the circuit and signal processing section as well as keeping the unit compact and decreasing power consumption when spreading and synthesizing the spread plural channels.

In case the above-described CDMA unit construction is applied to the transmission section in the base station for mobile communication, the same effect as described above is obtained such as down-sizing of the circuit and signal processing section, compact unit and decreased power consumption.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
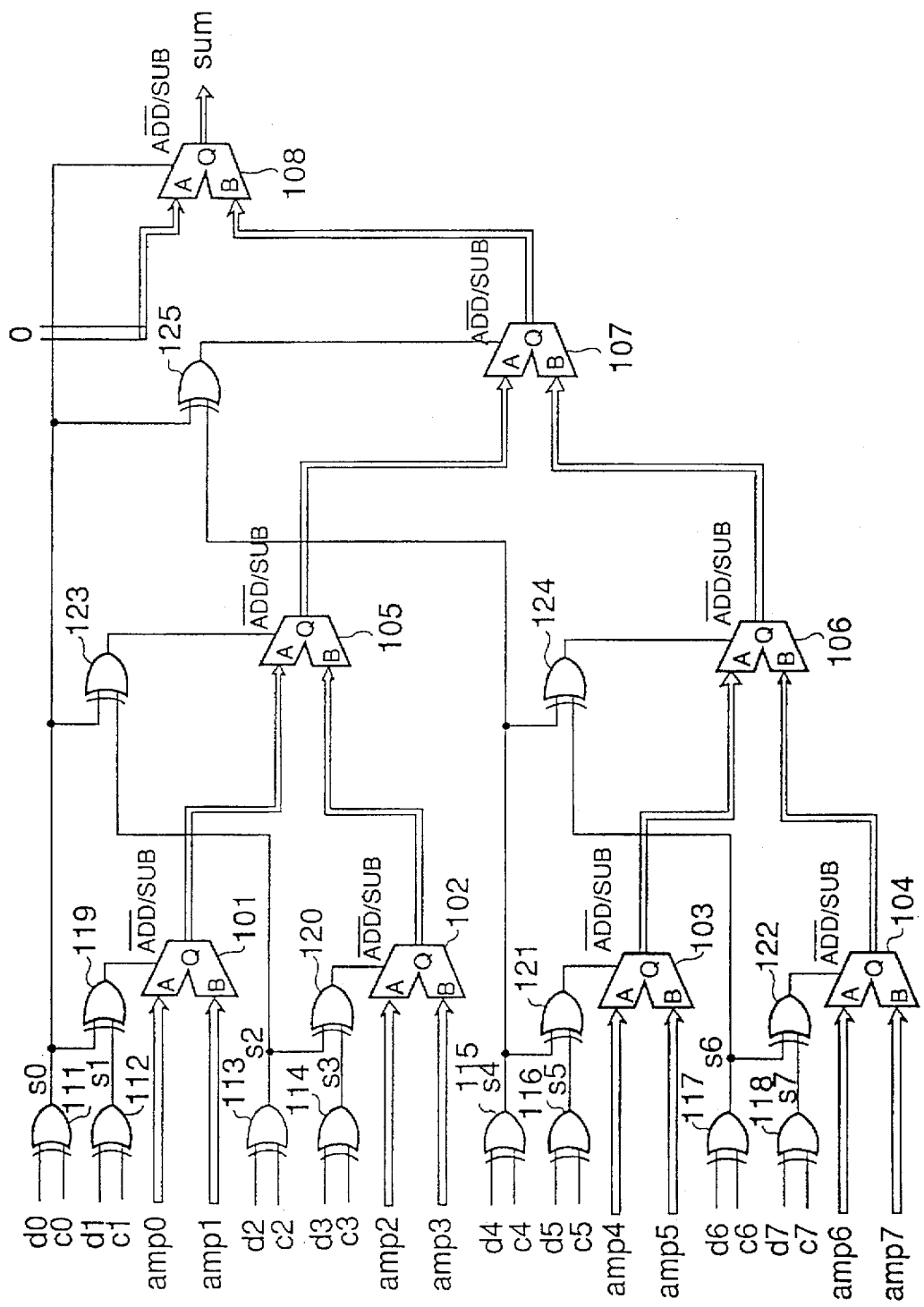
FIG. 1 is a circuit diagram of a CDMA unit of the present invention.

Referring to the drawings, an embodiment of the CDMA unit of the present invention is described in detail.

FIG. 1 is a block diagram showing a construction of the CDMA unit as an embodiment of the present invention.

The CDMA unit is provided with first stage addition/subtraction circuits 101, 102, 103 and 104, input terminals A and B of which receive 2 channel of transmission amplification signals amp0, amp1, amp2, amp3, amp4, amp5, amp6 and amp7 having plural bit width (for example, 16 bit width). Those transmission amplification signals correspond to 8 channels (number 0 to 7), respectively.

The transmission amplification signals amp0 to amp7 input to the addition/subtraction circuits 101 to 104 are updated at every block of a plurality of transmission data (transmission signals) d0, d1, d2, d3, d4, d5, d6 and d7. When spreading the transmission data with M chip (M is an integer), the spread code sequence signals c0, c1, c2, c3, c4, c5, c6 and c7 are varied with a block signal equivalent to each transmission data d0 to d7 multiplied by M.

The CDMA unit is provided with exclusive OR (EX-OR gate) circuits 111 and 112 for obtaining an exclusive OR of two signal among transmission data d0 to d7 and the spread code sequence signals c0 to c7 representing spread code sequence used for distinguishing a plurality of channels. The exclusive OR (EX-OR gate) circuit 111 and 112 receive inputs of the transmission data d0 and d1 and the spread code sequence signals c0 and c1 for transmitting the code sequence signals s0 and s1.

The CDMA unit is provided with exclusive OR circuits 113 and 114 where the transmission data d2 and d3 and the spread code sequence signals c2 and c3 are input and the code sequence signals s2 and s3 are transmitted, and exclusive OR circuits 115 and 116 where the transmission data d4 and d5 and the spread code sequence signals c4 and c5 are input and the code sequence signals s4 and s5 are transmitted.

The CDMA unit is provided with the exclusive OR circuit 117 and 118 where the transmission data d6 and d7 and the spread code sequence signals c6 and c7 are input and code sequence signals s6 and s7 are transmitted.

The CDMA unit is provided with an exclusive OR circuit 119 where code sequence signals s0 and s1 are input from the exclusive OR circuit 111 and 112 and a control signal for addition/subtraction is output to a control terminal sub/add of the addition/subtraction circuit 101, and an exclusive OR circuit 120 where code sequence signals s2 and s3 from the exclusive OR circuits 113 and 114 and a control signal for addition/subtraction is output to a control terminal sub/add of the addition/subtraction circuit 102.

The CDMA unit is provided with an exclusive OR circuit 121 where code sequence signals s4 and s5 are input from the exclusive OR circuits 115 and 116 and a control signal for addition/subtraction is output to the control terminal sub/add of the addition/subtraction circuit 103, and an exclusive OR circuit 122 where code sequence signals s6 and s7 are input from the exclusive OR circuits 117 and 118 and a control signal for addition/subtraction is output to the control terminal sub/add of the addition/subtraction circuit 104.

The CDMA unit is provided with a second stage addition/subtraction circuit 105 where each synthesized signal from the output terminal Q of the addition/subtraction circuits 101 and 102 is input to input terminals A and B, and an addition/subtraction circuit 106 where each synthesized addition/subtraction signal output from the output terminal Q of the addition/subtraction circuits 103 and 104 is input to input terminals A and B.

The CDMA unit is provided with an exclusive OR circuit 123 where the code sequence signals s0 and s2 are input and a control signal for adding/subtracting is output to the control terminal sub/add of the addition/subtraction circuit 105, and an exclusive OR circuit 124 where the code sequence signals s4 and s6 are input and a control signal for adding/subtracting is output to the control terminal sub/add of the addition/subtraction circuit 106.

The CDMA unit is provided with an addition/subtraction circuit 107 where the synthesized signal output from each output terminal Q of the addition/subtraction circuits 105 and 106 is input to input terminals A and B, and an exclusive OR circuit 125 where the code sequence signals s0 and s4 are input and a control signal for adding/subtracting is output to the control terminal sub/add of the third stage addition/subtraction circuit 107.

The CDMA unit is provided with an addition/subtraction circuit 108 where the code of the synthesized signal through the addition/subtraction circuit 107 is forwarded/inverted, and a spread/synthesis signal sum obtained from adding 8-channel signals spread with the spread code sequence signals c0 to c7 are output.

FIG. 2A to 2F are timing charts showing a signal waveform of each section in relation with the processing timing.

Figure 2:
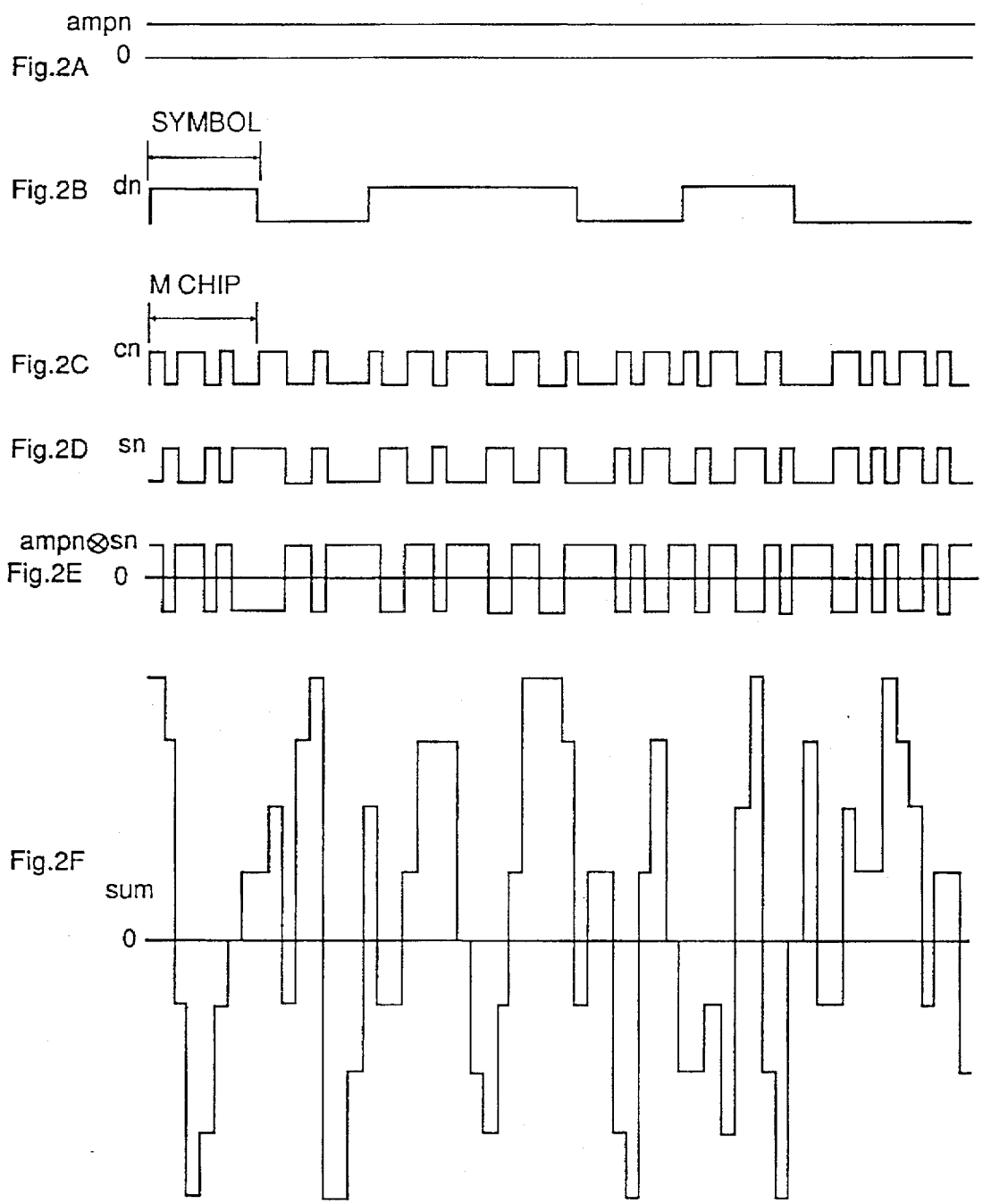
FIG. 2A to 2F are timing charts showing signal waveform of the respective sections of the CDMA unit in relation with processing timing.
Figure 3:
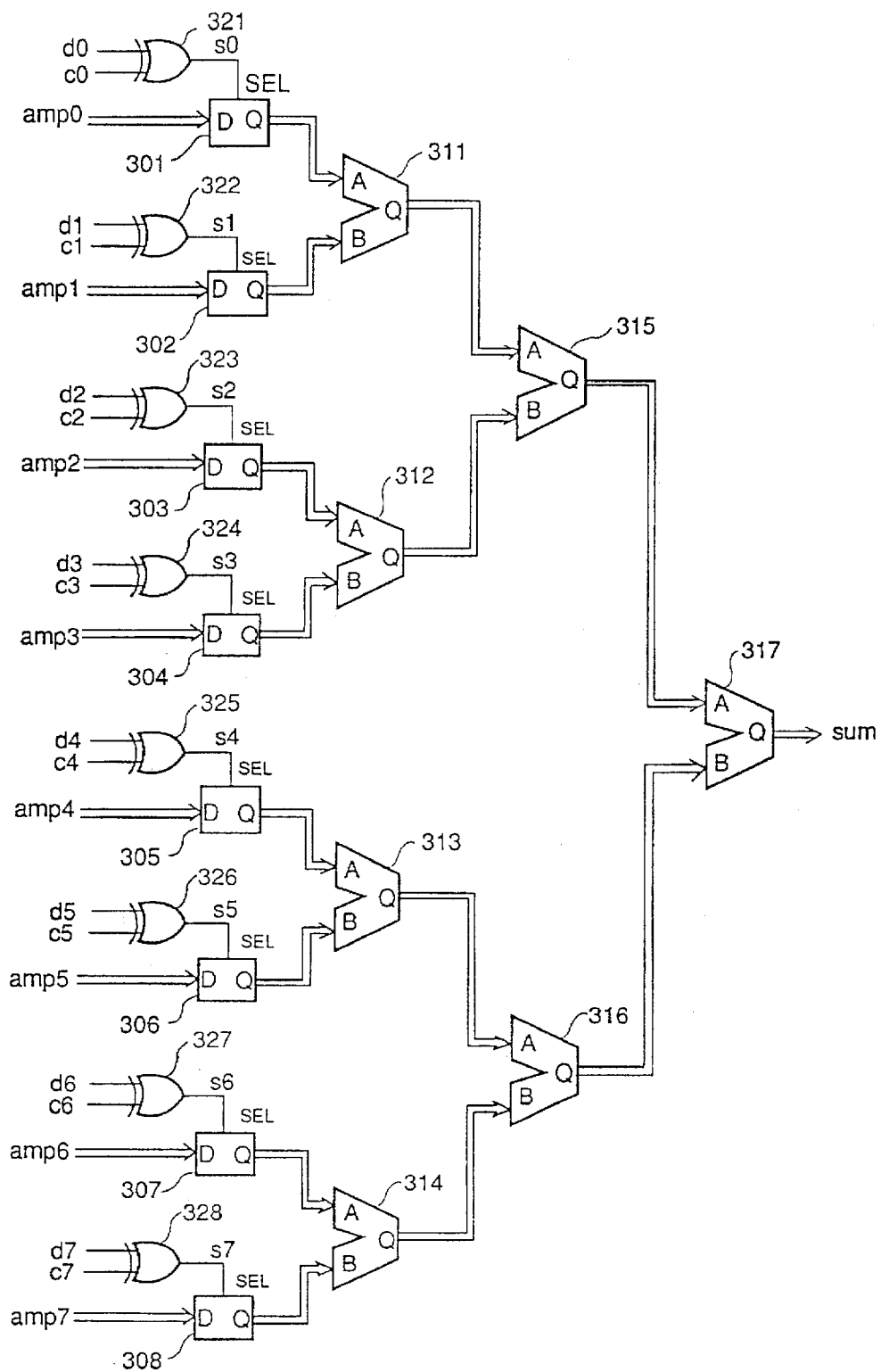
FIG. 3 is a circuit diagram of a prior art CDMA unit.

Referring to FIG. 2A, 2 channels of the transmission amplification signals amp0 to amp7 are input to the input terminal A and B of the addition/subtraction circuits 101 to 104. Those addition/subtraction circuits 101 to 104 execute adding or subtracting based on the logic of the control signal input to the control terminal sub/add. As a result, signals of 2 channels are synthesized for decreasing the transmission amplification signals amp0 to amp7 to half. For this, the operation represented as the following equation (2) is operated:

$$\text{sub/add} = \begin{pmatrix} 0 & (A+B) \\ 1 & (A-B) \end{pmatrix}. \quad (2)$$

The signals resulted from adding/subtracting by the addition/subtraction circuits 101 to 104 are input to the input terminals A and B of the second stage addition/subtraction deices 105 and 106. The signals of 2 channels synthesized for decreasing them into half through the addition/subtraction circuits 105 and 106 is input to the input terminal A and B of the third stage addition/subtraction circuit 107. The resultant signal is input to the input terminal B of the last stage addition/subtraction circuit 108 for code inversion, from where the spread/synthesis signal of 8 channels sum is output. The input terminal A of the addition/subtraction circuit 108 has constantly an input of a low (L) level "0".

In this case, the control terminal sub/add of the addition/subtraction circuits 101 to 104 receive inputs of the control signal sent from the exclusive OR circuits 119 to 122. The control signal is produced in the way described below.

The exclusive OR circuits 111 to 118 obtain the exclusive OR of the transmission data d0 to d7 shown in FIG. 2B and the spread code sequence signals c0 to c7 shown in FIG. 2C at each channel for producing the code sequence signals s0 to s7. More specifically, the exclusive OR circuit 111 obtains the exclusive OR of the transmission data d0 and the spread code sequence signal c0 for producing the code sequence signal s0. The exclusive OR circuit 112 obtains the exclusive OR of the transmission data d1 and the spread code sequence signal c1 for producing the code sequence signal s1. The obtained code sequence signals s0 and s1 are input to the exclusive OR circuit 119.

Similarly the exclusive OR circuit 113 obtains the exclusive OR of the transmission data d2 and the spread code sequence signal c2 for producing the code sequence signal s2.

The exclusive OR circuit 114 obtains the exclusive OR of the transmission data d3 and the spread code sequence signal c3 for producing the code sequence signal s3. The obtained code sequence signals s2 and s3 are input to the exclusive OR circuit 120.

The exclusive OR circuit 115 obtains the exclusive OR of the transmission data d4 and the spread code sequence signal c4 for producing the code sequence signal s4. The exclusive OR circuit 116 obtains the exclusive OR of the transmission data d5 and the spread code sequence signal c5 for producing the code sequence signal s5. The obtained code sequence signals s4 and s5 are input to the exclusive OR circuit 121.

The exclusive OR circuit 117 obtains the exclusive OR of the transmission data d6 and the spread code sequence signal c6 for producing the code sequence signal s6. The exclusive OR circuit 118 obtains the exclusive OR of the transmission data d7 and the spread code sequence signal c7 for producing the code sequence signal s7. The obtained code sequence signals s6 and s7 are input to the exclusive OR circuit 122.

The above-obtained code sequence signals s0 to s7 represent polarity of the transmission signal of each channel, which can be expressed by the following equation:

$$sn = \begin{pmatrix} 0 & (+) \\ 1 & (-) \end{pmatrix} \quad (3)$$

The control signal input to the control terminal sub/add of the first stage addition/subtraction circuits 101 to 104 is obtained from the exclusive OR of the code sequence signals s0 to s7 corresponding to the channel input to the input terminal A and B.

The control signals input to the control terminal sub/add of the second addition/subtraction circuits 105 and 106 and the third stage addition/subtraction circuit 107 are obtained from the exclusive OR of the code sequence signals s0 to s7 corresponding to the channel which have been input to the input terminal A in the previous stage. That is the control signal of the addition/subtraction circuit 105 is obtained from the exclusive OR of the code sequence signal s0 and the code sequence signal s2. The control signal of the addition/subtraction circuit 106 is obtained from the exclusive OR of the code sequence signal s4 and the code sequence signal s6. The control signal of the addition/subtraction circuit 107 is obtained from the exclusive OR of the code sequence signal s0 and the code sequence signal s4.

The input terminal A of the last stage addition/subtraction circuit 108 for code inversion constantly receives an input of a low (L) level "0". The input terminal B receives an input of a signal synthesized through the addition/subtraction circuit 107. The code sequence signal s0 is only input as the control signal. A signal synthesized through the addition/subtraction circuit 107 is subjected to code forwarding/inversion for outputting the spread/synthesis signal sum obtained by adding 8 channel signals.

Spreading and synthesizing shown in FIG. 2F can be expressed by the following equations (4), (5) and (6).

$$\begin{aligned}
\text{Sum} &= s0 \times [\{(amp0 + s0 \times s1 \times amp1) + \quad (4) \\
&\quad s0 \times s2 \times (amp2 + s2 \times s3 \times amp3)\} + \\
&\quad s0 \times s4 \times \{(amp4 + s4 \times s5 \times amp5) + \\
&\quad s4 \times s6 \times (amp6 + s6 \times s7 \times amp7)\}] \\
&= amp0 \times s0 + amp1 \times s1 + \\
&\quad amp2 \times s2 + amp3 \times s3 + \\
&\quad amp4 \times s4 + amp5 \times s5 + \\
&\quad amp6 \times s6 + amp7 \times s7 \\
&\quad \Sigma ampn \times \text{sign}(dn) \times \text{sign}(cn)
\end{aligned}$$

where $$\text{sign}(x) = \begin{pmatrix} +1 & (x=0) \\ -1 & (x=1) \end{pmatrix} \quad (5)$$

$$sn = \text{sign}(dn) \times \text{sign}(cn) \quad (6)$$

The above equations provide the spread/synthesis signal sum of 8 channel signals shown in FIG. 2F. In this case, unlike the prior art spreading and synthesizing are not conducted independently but conducted simultaneously. Therefore the polarity inverter required for each channel is no longer necessary. The polarity inverter required for the last stage can be also substituted with the addition/subtraction circuit.

The present invention reduces the number of devices used as the polarity inverters so that the circuit construction is simplified as well as keeping the unit compact, decreasing power consumption and simplifying the manufacturing process.

The CDMA unit of the present invention executes spreading and synthesizing simultaneously by adding/subtracting the transmission amplification signal of each channel responding to the control signal based on the transmission code sequence obtained from the logic of the transmission signals of the plural channels and the spread code sequence. Since code forwarding/inversion is substituted with adding/ subtracting, the present invention can be formed of the addition/subtraction circuit and the exclusive OR circuits only. So spreading and synthesizing the spread plural channels are conducted through down-sized circuit and signal processing section. Accordingly the unit size can also be kept compact with decreased power consumption and simplified manufacturing process.

The construction of the CDMA unit can be formed to be used for the transmission section in the base station for mobile communication. In this case, spreading and synthesizing in the base station can also be executed through down-sized circuit and signal processing section. Accordingly the unit size is kept compact with decreased power consumption and simplified manufacturing process.

What is claimed is:

1. A code division multiple access unit for spreading and synthesizing transmission signals of a plurality of channels by using a spread spectrum system comprising:

first logic processing means for producing a transmission code sequence based on a logic of a transmission signal and a spread code sequence at each channel;

addition/subtraction means for adding and/or subtracting a transmission amplification signal of said each channel; and second logic processing means for producing a control signal which controls addition and/or subtraction of said addition/subtraction means based on said transmission code sequence produced by said first logic processing means.

2. A code division multiple access unit for spreading and synthesizing transmission signals of a plurality of channels by using a spread spectrum system comprising:

first logic processing means for producing a transmission code sequence based on a logic of a transmission signal and a spread code sequence at each channel, said first logic processing means comprising a plurality of exclusive OR circuits for producing a transmission code sequence by obtaining an exclusive OR of a transmission signal and a spread code sequence at each channel;

addition/subtraction means for adding and/or subtracting a transmission amplification signal of said each channel; and second logic processing means for producing a control signal which controls addition and/or subtraction of said addition/subtraction means based on said transmission code sequence produced by said first logic processing means.

3. A code division multiple access unit for spreading and synthesizing transmission signals of a plurality of channels by using a spread spectrum system comprising:

first logic processing means for producing a transmission code sequence based on a logic of a transmission signal and a spread code sequence at each channel;

addition/subtraction means for adding and/or subtracting a transmission amplification signal of said each channel; and second logic processing means for producing a control signal which controls addition and/or subtraction of said addition/subtraction means based on said transmission code sequence produced by said first logic processing means, said second logic processing means comprising a plurality of exclusive OR circuits for producing a control signal which controls said addition/subtraction means by obtaining an exclusive OR of two values of transmission code sequence.

4. A code division multiple access unit for spreading and synthesizing transmission signals of a plurality of channels by using a spread spectrum system comprising:

first logic processing means for producing a transmission code sequence based on a logic of a transmission signal and a spread code sequence at each channel, said first logic processing means producing a code sequence representing polarity of a transmission signal of each channel by obtaining an exclusive OR of a transmission signal and a spread code sequence for predetermined channel at each channel;

addition/subtraction means for adding and/or subtracting a transmission amplification signal of said each channel, said addition/subtraction means producing a first input terminal and a second input terminal, wherein a transmission amplification signal input to said first input terminal and a transmission amplification signal input to said second input terminal are added to be synthesized when said control signal indicates addition and a transmission amplification signal input to said second input terminal is subtracted from a transmission amplification signal input to said first input terminal to be synthesized when said control signal indicates subtraction;

second logic processing means for producing a control signal which controls addition and/or subtraction of said addition/subtraction means based on said transmission code sequence produced by said first logic processing means, said second logic processing means producing said control signal by obtaining an exclusive OR of a transmission code sequence corresponding to a channel of transmission amplification signal input to said first input terminal of said addition/subtraction means in a previous stage among channels corresponding to transmission amplification signals input to said first input terminal of said addition/subtraction means; and a transmission code sequence correspond to a channel of the transmission amplification signal input to said first input terminal of said addition/subtraction means in a previous stage among channels corresponding to transmission amplification signals input to said second input terminal of said addition/subtraction means.

5. A code division multiple access unit for spreading and synthesizing transmission signals of a plurality of channels by using a spread spectrum system comprising:

first logic processing means for producing a transmission code sequence based on a logic of a transmission signal and a spread code sequence at each channel;

addition/subtraction means for adding and/or subtracting a transmission amplification signal of said each channel;

second logic processing means for producing a control signal which controls addition and/or subtraction of said addition/subtraction means based on said transmission code sequence produced by said first logic processing means; and a second addition/subtraction means provided with a first input terminal receiving an input of a low level signal and a second input terminal receiving an input of a transmission amplification signal obtained by synthesizing transmission amplification signals of a plurality of channels for inverting said synthesized transmission amplification signal based on a transmission code sequence of a predetermined channel.

6. A code division multiple access unit for spreading and synthesizing transmission signals of a plurality of channels by using a spread spectrum system comprising:

a plurality of first exclusive OR circuits, each of said first exclusive OR circuits for producing a transmission code sequence of said predetermined channel by obtaining an exclusive OR of a transmission signal of a predetermined channel and a spread code sequence of said predetermined channel;

a plurality of first addition/subtraction means, each of said first addition/subtraction means provided with a first input terminal and a second input terminal for adding a transmission amplification signal input to said first input terminal and a transmission amplification signal input to said second input terminal for performing synthesis when a first control signal indicates addition and for subtracting a transmission amplification signal input to said second input terminal from a transmission signal input to said first input terminal for performing synthesis when a second control signal indicates subtraction;

a plurality of second exclusive OR circuits, each of said second exclusive OR circuits for producing said first control signal by obtaining an exclusive OR of a transmission code sequence of a channel corresponding to a transmission amplification signal input to said first input terminal of said first addition/subtraction means and a transmission code sequence of a channel corresponding to a transmission amplification signal input to said second input terminal of said first addition/subtraction means;

a plurality of second addition/subtraction means provided with a first input terminal and a second input terminal to which a transmission amplification signals obtained by synthesizing signals of plural channels are input for adding a transmission amplification signal input to said first input terminal and a transmission amplification signal input to said second input terminal for performing synthesis when said second control signal indicates addition, and subtracting a transmission amplification signal input to second input terminal from a transmission amplification signal input to said first input terminal for performing synthesis when said second control signal indicates subtraction;

a plurality of third exclusive OR circuits for producing said second control signal by obtaining an exclusive OR of a transmission code sequence corresponding to a channel of a transmission amplification signal input to said first terminal of said addition/subtraction means in a previous stage among channels corresponding to transmission amplification signals input to said first input terminal of said second addition/subtraction means and a transmission code sequence corresponding to a channel of transmission amplification signal input to said first input terminal of said addition/subtraction means in a previous stage among channels corresponding to transmission amplification signal input to said second input terminal of said second addition/subtraction means; and a third addition/subtraction means provided with a first input terminal to which a low level signal is input and a second input terminal to which a transmission amplification signal obtained by synthesizing transmission amplification signals of plural channels is input for inverting said synthesized transmission amplification signal based on a transmission code sequence of a predetermined channel.

7. The code division multiple access unit of claim 6 with n channels (n is an even number), comprising n units of said first exclusive OR circuit, n/2 units of said second exclusive OR circuit, (n/2−1) units of said third exclusive OR circuit, n/2 units of said first addition/subtraction means and (n/2−1) units of said second addition/subtraction means.

8. The code division multiple access unit of claim 6 with n channels (n is an odd number), comprising n units of said first exclusive OR circuit, (n−1)/2 units of said second exclusive OR circuit, (n−1)/2 units of said third exclusive OR circuit, (n−1)/2 units of said first addition/subtraction means and (n−1)/2 units of said second addition/subtraction means.

9. A code division multiple access method for spreading and synthesizing transmission signals of a plurality of channels by using a spread spectrum system, said method comprising steps of:

producing a polar code sequence representing polarity of a transmission amplification signal of said predetermined channel based on a logic of a transmission signal of a predetermined channel and spread code sequence of said predetermined channel at every channel;

producing a control signal based on a logic of a polar code sequence at each pair of two values of said polar code sequence; and synthesizing transmission amplification signal equivalent to 1 pair by adding and/or subtracting based on a control signal of each pair.

10. The code division multiple access method of claim 9, wherein said step of producing said polar code sequence comprises a step of producing a polar code sequence representing polarity of a transmission signal of said predetermined channel by obtaining an exclusive OR of a transmission signal of a predetermined channel and spread code sequence of said predetermined channel.

11. The code division multiple access method of claim 9, wherein said step of producing said control signal comprises a step of producing said control signal by obtaining an exclusive OR of said polar code sequence at each pair formed of two values of said polar code sequence.

12. The code division multiple access method of claim 9 further comprising a step of inverting a transmission amplification signal obtained by synthesizing through adding or subtracting said synthesized transmission amplification signal and a low level signal based on a predetermined polar code sequence.

* * * * *